United States Patent [19]

Inam et al.

[11] Patent Number: 5,177,676

[45] Date of Patent: Jan. 5, 1993

[54] VOLTAGE SOURCE WITH ENHANCED SOURCE IMPEDANCE CONTROL

[75] Inventors: Haroon Inam; Robert W. Johnson, Jr., both of Raleigh, N.C.

[73] Assignee: Exide Electronics Corporation, Raleigh, N.C.

[21] Appl. No.: 768,363

[22] Filed: Sep. 27, 1991

[51] Int. Cl.[5] ............................................. H02M 7/538
[52] U.S. Cl. ........................................ 363/80; 363/97; 363/134; 323/285
[58] Field of Search ................... 363/15, 24, 25, 26, 363/97, 134, 79, 80; 323/282, 285

[56] References Cited

U.S. PATENT DOCUMENTS

| | | | |
|---|---|---|---|
| 4,322,817 | 3/1982 | Kuster | 363/26 |
| 4,456,872 | 6/1984 | Froeschle | 363/21 |
| 4,872,100 | 10/1989 | Diaz | 363/98 |
| 4,885,674 | 12/1989 | Varga et al. | 363/97 |
| 4,922,210 | 5/1990 | Flachenecker et al. | 331/167 |
| 4,973,174 | 11/1990 | Losic et al. | 318/811 |
| 5,001,770 | 3/1991 | Losic et al. | 318/811 |
| 5,013,998 | 5/1991 | Varga et al. | 363/21 |
| 5,023,541 | 6/1991 | Yosinski | 323/275 |
| 5,062,031 | 10/1991 | Flachenecker et al. | 363/97 |

*Primary Examiner*—Steven L. Stephan
*Assistant Examiner*—Jeffrey Sterrett

*Attorney, Agent, or Firm*—Woodcock, Washburn, Kurtz, Mackiewicz & Norris

[57] ABSTRACT

A voltage source having a current feedback control loop for enhanced source impedance control of the output of the voltage source. Current feedback is used for a voltage-source amplifier wherein the source impedance is increased/decreased and/or reshaped by the voltage source amplifier's closed-loop gain and the additional current feedback. In particular, the enhanced source impedance control is accomplished through feedback of the output current of the voltage source to an analog error amplifier at an input to the voltage control loop. The output impedance $Z_{desired}$ is then adjusted in accordance with the equation $Z_{desired} = Z_{inv1} \{1 + G(s) H(s)\}$, where $G(s)$ is the voltage source amplifier's closed-loop transfer function, $H(s)$ is the transfer function of the output current feedback circuit and $Z_{inv1}$ is the original source impedance of the voltage controlled voltage amplifier. Thus, once $G(s)$ is defined, $H(s)$ may be defined simply as the combined impedance of the output current feedback circuit. Impedance of this output current feedback circuit may then be altered until the source impedance of the circuit causes the voltage generating circuit to provide an output impedance which corresponds to the desired output impedance.

12 Claims, 2 Drawing Sheets

VOLTAGE SOURCE WITH ENHANCED SOURCE IMPEDANCE CONTROL

BACKGROUND OF THE INVENTION

1. Field of the Invention

The present invention relates to a voltage source having a circuit for controlling the output impedance thereof, and more particularly, to a voltage source having a current feedback control loop for source impedance control.

2. Description of the Prior Art

In conventional voltage source amplifiers (VSAs), the source impedance is generally a given function of the open loop source impedance and gain of the voltage control loops (if any are used). As a result, the source impedance is a function of criteria unrelated to the required source impedance. Also, since some loads connected to the VSA output assume a certain source impedance, it has heretofore been difficult to match the output impedance of the VSA to the input impedance of a load connected to the VSA. Full-wave diode bridge capacitive filtered rectifiers are representative of such loads and generally have a source impedance which is less than one percent of the full load of the VSA. Thus, the input current to such rectifiers typically has a characteristic high peak. When this peak current is multiplied by the corresponding peak output voltage of the VSA, a high peak power output results. This high peak power output imposes a stringent specification on the voltage source peak power handling capability and is generally costly to implement.

Accordingly, it is desired to overcome the above-mentioned problems of the prior art by designing a voltage source amplifier which enables the source impedance to be adjusted and/or reshaped such that it is optimal for the corresponding load. The present invention has been designed to provide such capabilities.

SUMMARY OF THE INVENTION

The present inventors have solved the aforementioned problems in the prior art by designing a current feedback control loop for source impedance control of a voltage source whereby the source impedance may be tailored to match the desired impedance. The present invention solves the problems of the prior art by using current feedback for the voltage source amplifier such that the source impedance is reshaped by the VSA closed loop gain and the additional current feedback.

In particular, the present invention relates to a voltage source having adjustable output impedance. Such a voltage source in accordance with the invention preferably comprises a voltage control loop having means for generating an output voltage signal and means responsive to the output voltage signal for providing negative voltage feedback to an input of the output voltage signal generating means. However, in accordance with the invention, such a voltage source further comprises a current feedback control loop for controlling the output impedance of the output voltage signal generating means. In a preferred embodiment, the current feedback control loop comprises means for monitoring an output current of the output voltage signal generating means and an output current feedback circuit responsive to the output current for providing current feedback to the input of the output voltage signal generating means. The output impedance is then adjusted in accordance with the invention by the closed loop gain of the voltage control loop and the current feedback of the current feedback control loop. Preferably, the aforementioned voltage control loop further comprises an error amplifier responsive to an input voltage reference signal, an output of the error amplifier being provided to the output voltage signal generating means and an input of the error amplifier receiving the negative voltage feedback from the negative voltage feedback means. On the other hand, the output voltage signal generating means and negative voltage feedback means may comprise digital error filters and a voltage feedback loop controlled by a microprocessor, as would be apparent to those skilled in the art.

In a preferred embodiment of the invention, the output voltage signal generating means is a DC-to-AC switch-mode inverter with an inductive output impedance over the frequency range of interest. However, the output voltage signal generating means may be a switch-mode or a linear controlled AC voltage source with an output impedance which is either inductive, resistive or capacitive or any combination thereof over a frequency range of interest. Also, the output current monitoring means preferably comprises a current controlled voltage amplifier, which may be either a current transformer, a resistive current shunt, a Hall effect device or an optical current sensing device.

In a preferred embodiment of the invention, the output current feedback circuit comprises a filter which together with the output current monitoring means has a transfer function which is varied to thereby adjust the output impedance. Such a filter preferably comprises a resistor in parallel with a series combination of a resistor and capacitor, although other filters may also be used. Such a circuit allows the output impedance ($Z_{desired}$) to be defined by the equation: $Z_{desired} = -Z_{invl}\{1 + G(s)H(s)\}$, where $Z_{invl}$ is the original source impedance of the output voltage signal generating means, $G(s)$ is the transfer function of the voltage control loop and $H(s)$ is the transfer function of the current feedback control loop. Hence, the output impedance of the voltage source becomes a function of criteria related to the desired source impedance.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PREFERRED EMBODIMENT

Figure 1:
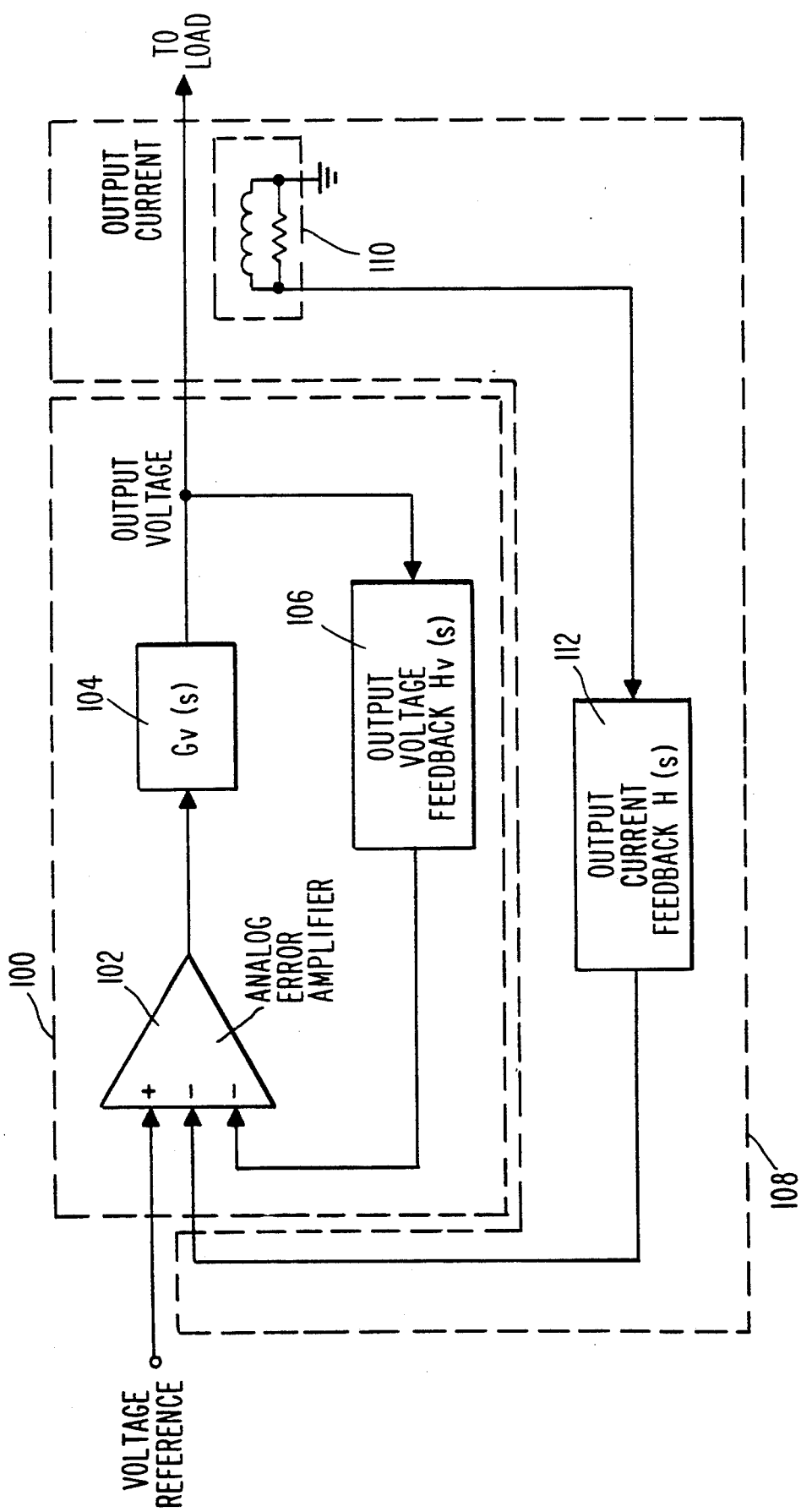
FIG. 1 is a general block diagram illustrating the enhanced source impedance control circuit of the invention.
Figure 2:
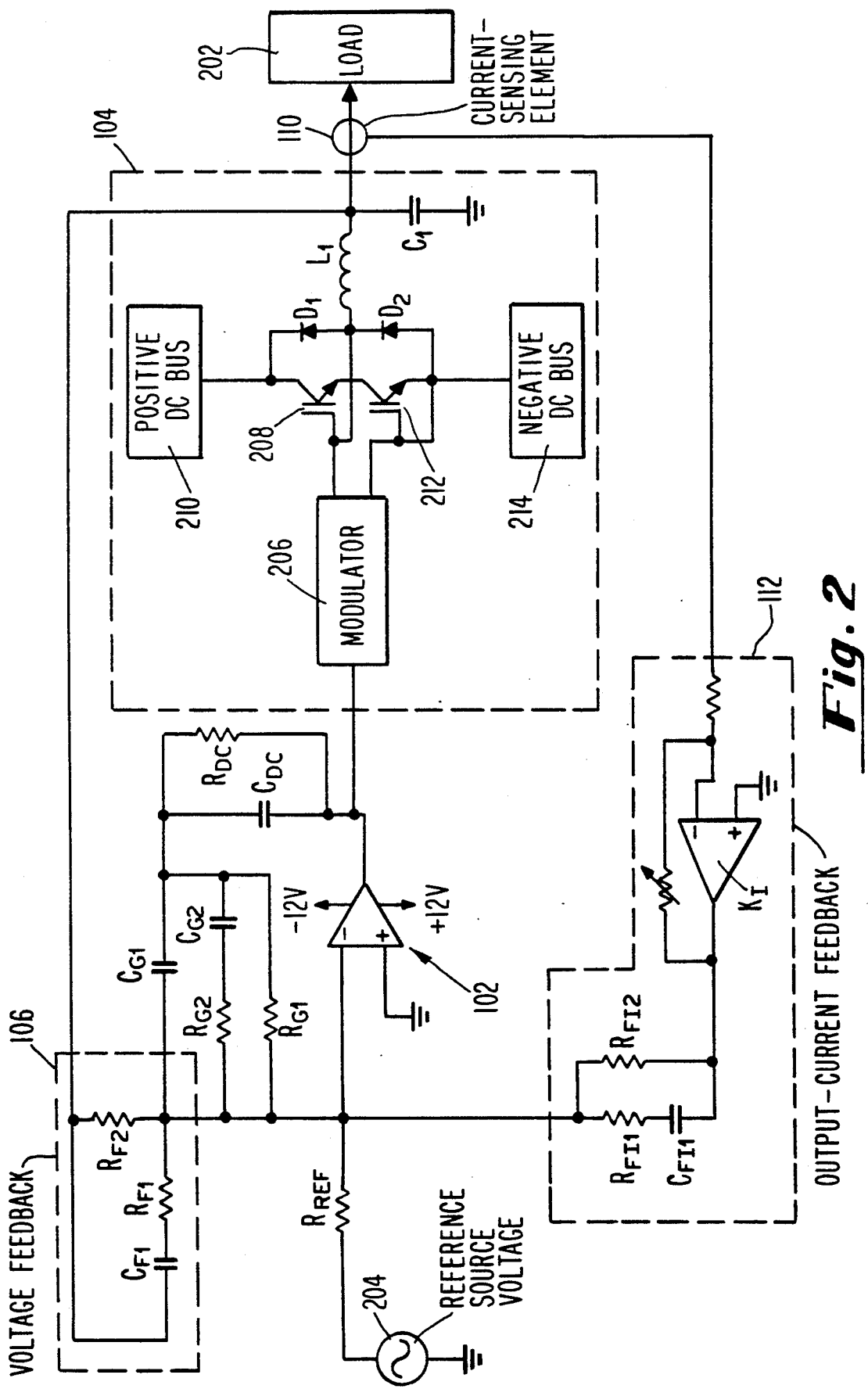
FIG. 2 illustrates a preferred embodiment of a DC-to-AC switch-mode inverter with an enhanced inductive source impedance circuit designed in accordance with the invention.

A system with the above-mentioned beneficial features in accordance with the presently preferred exemplary embodiment of the invention will be described below in detail with reference to FIGS. 1 and 2. Although the present invention will be described below with respect to a DC-to-AC switch mode inverter with an enhanced inductive source impedance, those skilled in the art will appreciate that the present invention is generally applicable to any controlled AC source (switch mode or linear) and the required source impedance for such a source, be it inductive, resistive, capacitive, or some combination thereof over a frequency range of interest. Accordingly, those skilled in the art will appreciate that the description given herein with respect to FIGS. 1 and 2 is for exemplary purposes only and is not intended in any way to limit the scope of the invention. All questions regarding the scope of the invention may be resolved by referring to the appended claims.

The enhanced source impedance control made possible in accordance with the present invention is accomplished through feedback of the output current to an analog error amplifier. In particular, FIG. 1 illustrates a simplified illustration of an embodiment of the invention comprising an inner voltage control loop 100. As shown, inner voltage control loop 100 generally comprises an analog error amplifier 102, a voltage generating circuit 104 for generating an output voltage, and an output voltage feedback circuit 106. Those skilled in the art also will appreciate that the inner voltage control loop 100 may be generally implemented through any error filtering mechanism including digital filters in a microprocessor based control loop or by way of a hardware based system as will be described below with respect to FIG. 2. As further shown in FIG. 1, the inner voltage-control loop 100 is used in conjunction with an enhanced source impedance control circuit 108 of the invention.

The enhanced source impedance control circuit 108 illustrated in FIG. 1 functions by monitoring the output current of the voltage generating circuit 104 using a suitable monitoring device 110 such as a current transformer. As will be described below with respect to FIG. 2, the voltage generating circuit 104 may be an inverter which provides an inverter output filter inductor current which is monitored by current monitoring device 110. Although the current monitoring device 110 as illustrated in FIG. 1 is a current transformer, a current transformer is not essential for sensing the current. Instead, the current may be sensed using a resistive current shunt, a Hall effect device, an optical current sensing device using Faraday's principle or another similar device known to those skilled in the art. In other words, any current controlled voltage amplifier (CCVA) can suffice for monitoring the current in accordance with the invention.

The output of CCVA 110 is connected to a filtering stage or output current feedback circuit 112. The filter and current control voltage amplifier frequency response implements a transfer function H(s) as illustrated. On the other hand, the VSA closed loop transfer function of the inner voltage control loop 100 is designated as G(s). Thus, in accordance with the invention, G(s) is generally given, while H(s) is determined and adjusted to reshape the source impedance.

In particular, if $Z_{esic}$ is determined to be the source impedance due to the enhanced source impedance control circuit of the invention, and $Z_{invl}$ is the original source impedance of the voltage controlled voltage amplifier, then the equation for calculating the source impedance $Z_{esic}$ may be expressed as follows:

$$Z_{esic} = Z_{invl}\{1 + G(s)H(s)\}.$$  Equation 1

Thus, the present inventors have discovered that by adjusting H(s) the output impedance $Z_{esic}$ may be adjusted to equal the desired output impedance of the voltage generating circuit 104. A preferred embodiment of a circuit embodying the invention will be described in more detail below with respect to FIG. 2.

FIG. 2 illustrates a preferred embodiment of the invention in which the voltage generating circuit 104 is a DC-to-AC switch mode inverter which drives a load 202. As shown in FIG. 2, the voltage reference is provided from a reference source voltage 204, and the reference source voltage signal functions as a command signal to the inverter 104, which functions to duplicate this reference signal at its output. The input reference source voltage need not be sinusoidal, but may be a square wave, a triangular wave, a sinusoidal wave with higher harmonics or another similar signal.

The reference source voltage is then provided across a reference resistor $R_{REF}$ to the analog error amplifier 102, and the output of the analog error amplifier 102 is provided to the inverter 104. As shown, the inverter 104 in accordance with a preferred embodiment of the invention comprises a modulator circuit 206 which generally takes an input carrier wave and applies it to a comparator, circuitry to introduce current limiting and dead time between the switching transistors, and circuits for monitoring the turn-on/turn-voltage off pulses at the output. These turn-on/turn-off pulses are then provided to output power transistor 208, which is connected to a positive voltage source 210, and to power output transistor 212, which is connected to a negative voltage source 214. Those skilled in the art will appreciate that although the power transistors 208 and 212 are shown as insulated gate bipolar transistors that bipolar transistors (BJTs), field effect transistors (FETs) or other forms of switches can also be used. Also, those skilled in the art will appreciate that anti-parallel diodes D1 and D2 may or may not be intrinsic to the power transistors 208 and 212 but are included for four quadrant operation.

Then, as shown, the joint output of the power transistors 208 and 212 is provided to an output filter which preferably consists of an inductor L1 and a capacitor C1. This LC output filter is typically included to attenuate the carrier component and higher order harmonics from the voltage at the common output point of the transistors 208 and 212. A series inductor-capacitor filter can also be added parallel to the main filter capacitor to attenuate the carrier component as would be apparent to those skilled in the art.

As shown in the embodiment of FIG. 2, the analog error amplifier 102 and inverter 104 are connected to a voltage feedback compensation circuit which is part of the output voltage feedback loop 106. The output-voltage feedback loop 106 corrects the output voltage of the inverter 104 with respect to the reference for undesired harmonic distortion, DC bus (210, 214) and load (202) variations. As would be apparent to those skilled in the art, although the compensation scheme illustrated in FIG. 2 is a quadruple-pole triple-zero type, other types of compensation may also be used to tailor the feedback loop 106 for purposes such as removal of the DC component in the output voltage.

As shown in FIG. 2, the forward compensation circuit for providing forward compensation around the feedback of the error amplifier 102 is made up of resistors $R_{G1}$, $R_{G2}$ $R_{DC}$ and capacitors $C_{G1}$, $C_{G2}$ and $C_{DC}$. On the other hand, the output feedback circuit 106 preferably comprises a voltage feedback compensation circuit comprising resistors $R_{F1}$ and $R_{F2}$ and capacitor $C_{F1}$. However, those skilled in the art will further appreciate that other more sophisticated feedback circuits and forward compensation circuits may be used in accordance with the techniques of the invention.

The enhanced source impedance control circuit of the invention comprising elements 110 and 112 is shown in more detail in FIG. 2. As noted above, the current sensor 110 can be of any of the types mentioned above so long as the current sensor senses the output current of the inverter 104. Moreover, a preferred embodiment of the output current feedback compensation circuit for providing current feedback to the error amplifier 102 in accordance with the technique of the invention preferably comprises resistors $R_{FI1}$ and $R_{FI2}$, capacitor $C_{FI1}$ and gain $K_I$. As noted above, the transfer function of the output current feedback circuit 112 can preferably be adjusted in accordance with techniques of the invention so as to allow derivation of the overall transfer function described above with respect to FIG. 1.

In particular, G(s) may be derived for use in Equation 1 from the following:

$$G(s) = \frac{G_v(s)}{1 + G_v(s) H_v(s)} \quad \text{Equation 2}$$

where:

$$G_v(s) = \left[\frac{Z_G(s)}{Z_{REF}(s)}\right] * G_{MOD} * G_{LCR} \quad \text{Equation 3}$$

and where $Z_G(s)$ equals the combined impedance of resistors $R_{G1}$, $R_{G2}$ and $R_{DC}$ and capacitors $C_{G1}$, $C_{G2}$ and $C_{DC}$; $Z_{REF}(s)$ equals $R_{REF}$; $G_{MOD}$ equals the gain of modulator 206; and $G_{LCR}$ equals the transfer function of the LC filter comprising elements L1 and C1.

By substituting Equation 3 into Equation 2 and rearranging for $H_v(s)$, the transfer function for the output voltage feedback circuit 106 may be determined as:

$$H_v(s) = \frac{Z_{REF}(s)}{Z_F(s)} * K \quad \text{Equation 4}$$

where $Z_{REF}(s)$ is defined above as $R_{REF}$, $Z_F(s)$ equals the combined impedance of resistors $R_{F1}$ and $R_{F2}$ and capacitor $C_{F1}$ of output voltage feedback circuit 106, and K is a scalar.

Now that G(s) is defined for the inner voltage control loop 100, H(s) may be defined simply as the combined impedance of the elements of the output current feedback circuit 112, namely, resistors $R_{FI1}$ and $R_{FI2}$, capacitor $C_{FI1}$ and scalar $K_I$. In other words, in accordance with the invention the output current feedback circuit 112 changes the current feedback impedance depending upon the sensed current so as to alter the source impedance of the inverter 104 by varying the input to the analog error amplifier 102. This can be expressed by rewriting Equation 1 as follows:

$$Z_{desired} = Z_{invr}\{1 + G(s)H(s)\} \quad \text{Equation 5}$$

Hence, H(s) may be altered to obtain the desired output impedance ($Z_{desired}$) such that the output current control loop 108 provides source impedance control for the voltage source.

Although an exemplary embodiment of the invention has been described in detail above, those skilled in the art will readily appreciate that many additional modifications are possible in the exemplary embodiment without materially departing from the novel teachings and advantages of the invention. For example, although the present invention was described with respect to a DC-to-AC switch mode inverter with enhanced inductive source impedance, the technique of the invention may also be generally applicable to any controlled AC source (switch-mode or linear) whereby the required source impedance is inductive, resistive, capacitive or some combination thereof over a frequency range of interest. Accordingly, all such modifications are intended to be included within the scope of this invention as defined in the following claims.

We claim:

1. A voltage source for applying a voltage to a load, said voltage source having adjustable output impedance, comprising:

a voltage control loop comprising means for generating an output voltage signal for application to said load and means responsive to said output voltage signal for providing negative voltage feedback to an input of said output voltage signal generating means; and a current feedback control loop for adjusting the output impedance of said output voltage signal generating means to a desired non-zero level in accordance with said load, said current feedback control loop comprising means for monitoring an output current of said output voltage signal generating means and an output current feedback circuit responsive to said output current for providing adjustable current feedback to said input of said output voltage signal generating means, whereby said output impedance is adjusted by the closed loop gain of said voltage control loop and the adjusted current feedback of said current feedback control loop until the output impedance obtains said desired non-zero level.

2. A voltage source as in claim 1, wherein said voltage control loop further comprises an error amplifier responsive to an input voltage reference signal, an output of said error amplifier being provided to said output voltage signal generating means and an input of said error amplifier receiving the negative voltage feedback from said negative voltage feedback means.

3. A voltage source for applying a voltage to a load, said voltage source having adjustable output impedance, comprising:

a voltage control loop comprising an error amplifier responsive to an input voltage reference signal, means responsive to an output of said error amplifier for generating an output voltage signal for application to said load and an output voltage feedback circuit responsive to said output voltage signal for providing negative feedback to a negative input of said error amplifier; and a current feedback control loop for adjusting the output impedance of said output voltage signal generating mans to a desired non-zero level in accordance with said load, said current feedback control loop comprising means for monitoring an output current of said output voltage signal generating means and an output current feedback circuit responsive to said output current for providing adjustable current feedback to said negative input of said error amplifier, whereby said output impedance is adjusted by the closed loop gain of said voltage control loop and the adjusted current feedback of said current feedback control loop until the output impedance obtains said desired non-zero level.

4. A voltage source as in claim 3, wherein said output voltage signal generating means is a linear controlled AC voltage source with an output impedance which is at least one of inductive, resistive and capacitive over a frequency range of interest.

5. A voltage source as in claim 3, wherein said output voltage signal generating means is a DC-to-AC switch mode inverter with an inductive output impedance.

6. A voltage source as in claim 3, wherein said output voltage signal generating means is a switch mode AC voltage source with an output impedance which is at least one of inductive, resistive and capacitive over a frequency range of interest.

7. A voltage source as in claim 3, wherein said output current monitoring means comprises a current controlled voltage amplifier.

8. A voltage source as in claim 7, wherein said current controlled voltage amplifier includes one of a current transformer, a resistive current shunt, a Hall effect device and an optical current sensing device.

9. A voltage source as in claim 3, wherein said output current feedback circuit comprises a filter which together with said output current monitoring means has a transfer function which is varied to thereby adjust said output impedance to said desired non-zero level.

10. A voltage source as in claim 9, wherein said filter comprises a resistor in parallel with a series combination of a resistor and capacitor.

11. A voltage source as in claim 3, wherein said output impedance ($Z_{desired}$) is defined by the equation:

$$Z_{desired} = Z_{invl}\{b + G(s)H(s)\},$$

where $Z_{invl}$ is the original source impedance of said output voltage signal generating means, $G(s)$ is the transfer function of said voltage control loop and $H(s)$ is the transfer function of said current feedback control loop.

12. A voltage source as in claim 3, wherein said output voltage signal generating means comprises a modulator responsive to said input voltage reference signal, power transistors connected to an output of said modulator for amplifying the output of said modulator and an inductor-capacitor filter for attenuating any carrier components and high order harmonics in the output voltage of said power transistors.

* * * * *

UNITED STATES PATENT AND TRADEMARK OFFICE
CERTIFICATE OF CORRECTION

PATENT NO. : 5,177,676
DATED : JANUARY 5, 1993
INVENTOR(S) : HAROON INAM AND ROBERT W. JOHNSON, JR

It is certified that error appears in the above-indentified patent and that said Letters Patent is hereby corrected as shown below:

In col. 4, line 24 delete "voltage".

In col. 4, line 66, after "output", insert --voltage--.

In col. 8, line 10, after "{", delete "b" and insert --1-- therefor.

Signed and Sealed this

Tenth Day of May, 1994

Attest:

BRUCE LEHMAN

Attesting Officer     *Commissioner of Patents and Trademarks*